United States Patent [19]

Klopfenstein et al.

[11] Patent Number: 5,758,932
[45] Date of Patent: Jun. 2, 1998

[54] MENTAL DRIVE WHEEL FOR ENDLESS GROUND ENGAGING DRIVE BELTS

[75] Inventors: Wayne A. Klopfenstein, Peoria; Gerald P. Simmons, Morton, both of Ill.

[73] Assignee: Caterpillar Inc., Peoria, Ill.

[21] Appl. No.: 911,211

[22] Filed: Aug. 14, 1997

Related U.S. Application Data

[63] Continuation of Ser. No. 629,692, Apr. 9, 1996, abandoned.

[51] Int. Cl.$^6$ ............................................. B62D 55/12
[52] U.S. Cl. ........................... 305/195; 305/115; 305/184
[58] Field of Search .............................. 305/56, 57, 115, 305/137, 165, 184, 193, 195, 199; 474/166, 184, 185, 186

[56] References Cited

U.S. PATENT DOCUMENTS

| | | | |
|---|---|---|---|
| 301,743 | 7/1884 | Michael | 305/115 X |
| 1,460,656 | 7/1923 | Kegresse | 305/184 |
| 1,821,196 | 9/1931 | Worley | 305/115 X |
| 3,142,192 | 7/1964 | Edberg | 474/186 |
| 4,198,103 | 4/1980 | Ward et al. | 305/165 |
| 4,284,409 | 8/1981 | Van Teslaar | 474/185 |
| 4,953,921 | 9/1990 | Burns | 305/165 |
| 5,363,936 | 11/1994 | Grawey et al. | 180/9.21 |

FOREIGN PATENT DOCUMENTS

| | | |
|---|---|---|
| 0 292 281 | 11/1988 | European Pat. Off. . |
| 0 725 002 | 2/1995 | European Pat. Off. . |
| 744164 | 2/1956 | United Kingdom . |
| 948843 | 2/1964 | United Kingdom . |
| 2104015 | 3/1983 | United Kingdom . |

*Primary Examiner*—Russell D. Stormer
*Attorney, Agent, or Firm*—Larry G. Cain

[57] ABSTRACT

Driving systems for belted machines have in the past utilized a common material interface to drive the belted machine. For example, rubber belted machines have generally used a rubber drive therewith. The present drive wheel is made of metal and includes a plurality of contacting elements attached to the outer surface of a drum. Each of the contacting elements have a contacting surface have a generally diamond configuration defining a leading point of contact, a trailing point of contact, a major length and a minor length. The plurality of contacting elements are arranged on the drum in a plurality of spaced apart rows which extend circumferentially along and axis and each of the major lengths coincide with the axis. Furthermore, the major length is greater in length than the minor length. The plurality of contacting elements extend from the outer surface a preestablished distance and the interface of the preestablished distance and the contacting surface form a sharp edge 67 or a point 68. Thus, this point 68 or sharp edges 67 of the diamond drive wheel aggressively separates the debris and enables a positive interface or contact between the drive wheel and an inner surface of a belt.

8 Claims, 4 Drawing Sheets

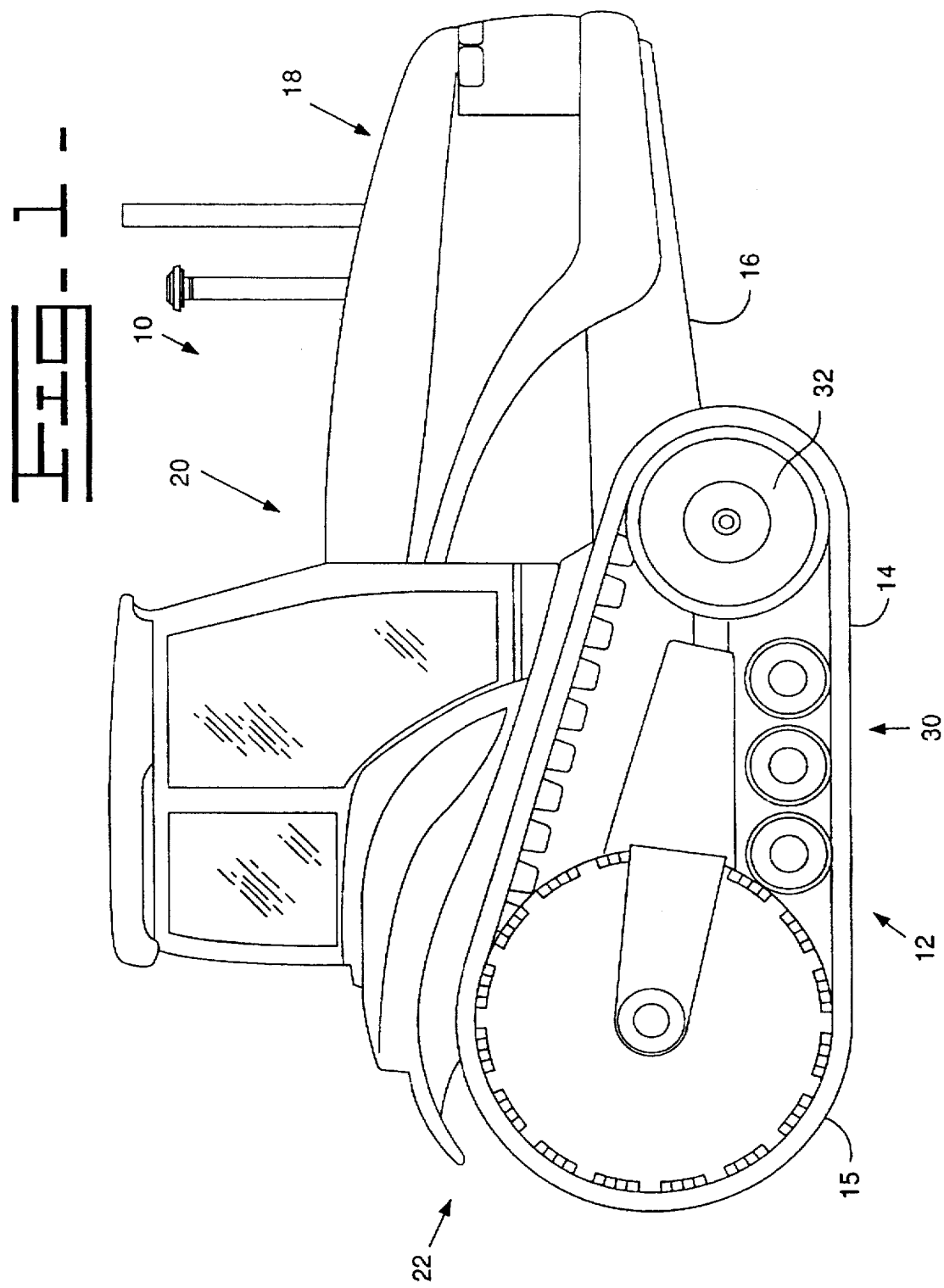

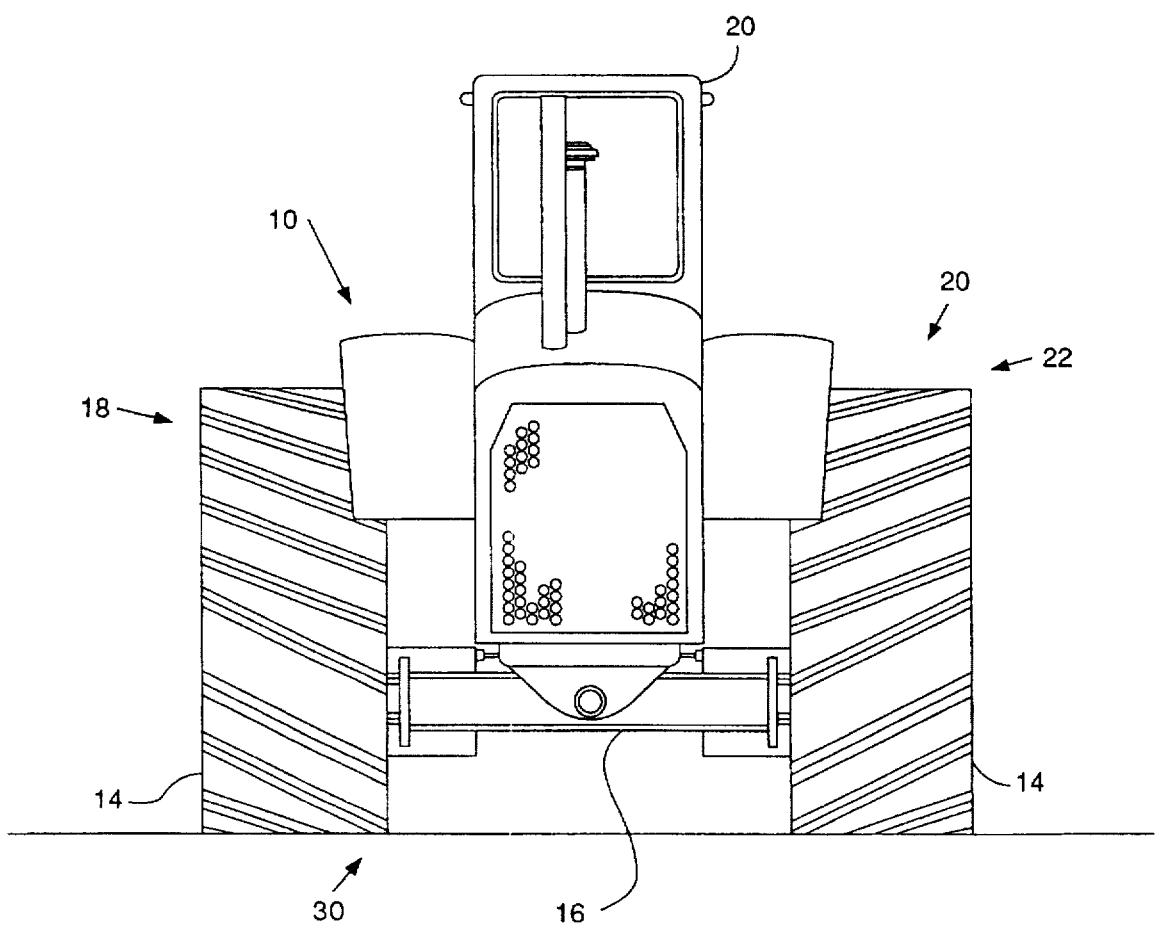

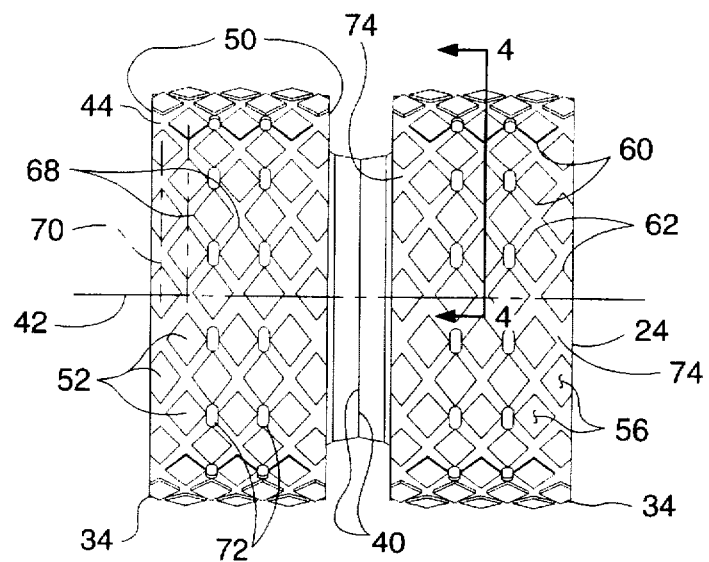
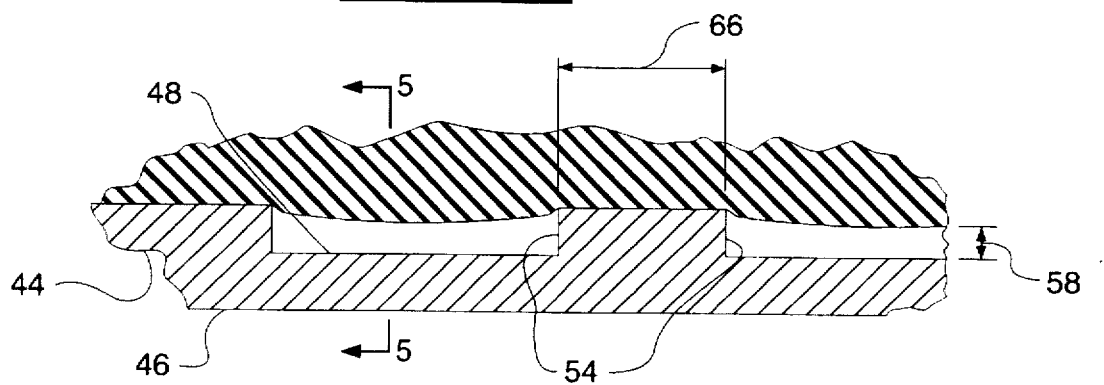

1
MENTAL DRIVE WHEEL FOR ENDLESS GROUND ENGAGING DRIVE BELTS

This is a file wrapper continuation of application Ser. No. 08/692,692, filed Apr. 9, 1996, now abandoned.

TECHNICAL FIELD

This invention relates generally to a drive wheel for a belted machine and more particularly to a metal drive wheel having a raised surface for engagement with a belt.

BACKGROUND ART

The popularity and nearly universal acceptance of wheel propulsion systems rather than track systems in agricultural use has stemmed primarily from the past track system's relatively higher noise levels, higher initial cost, lower maximum travel speed, and inability to transport itself on improved road surfaces without inflicting unacceptable damage.

Present day systems have overcome the majority of these objections by utilizing a propulsion system in which a continuous rubber belt is entrained about a pair of wheels. Problems encountered in actually reducing such belt system to practice include how to drive such belt with the entrained wheels, how to maintain structural integrity of the belt and wheels, how to entrain the belt in lateral alignment with the wheels when the wheels are subject to large lateral loads, how to provide long life for the belt and wheels, and how to accommodate debris ingested between the wheels and belt while maintaining the driving relationship therebetween without damaging either.

The present invention is directed to overcome one or more of the problems as set forth above.

DISCLOSURE OF THE INVENTION

In one aspect of the invention a drive wheel is adapted for use with an endless rubber belt driven work machine is comprised of the drive wheel having a mounting disc attached to a generally cylindrical drum which defines an outer surface and a pair of side members. A plurality of contacting elements are attached to the outer surface and are positioned in a plurality of rows defining an axis. Each of the plurality of rows extend between the pair of side members and are spaced apart a preestablished distance which forms a plurality of passages. The plurality of contacting elements have a diamond configuration being defined by a plurality of sides and a contacting surface. The plurality of contacting elements define a point of contact and the diamond configuration is defined by a major length and a minor length and the major length is aligned with the axis.

BRIEF DESCRIPTION OF THE DRAWINGS

FIG. 1 is a side elevational view of the work machine embodying the present invention;

FIG. 2 is a front elevational view of the work machine embodying the present invention;

FIG. 3 is a front elevational view of a drive wheel embodying the present invention;

FIG. 4 is an enlarged sectional view of the interface between the drive wheel and an endless belt as taken along lines 4—4 of FIG. 3.

Figure 5:
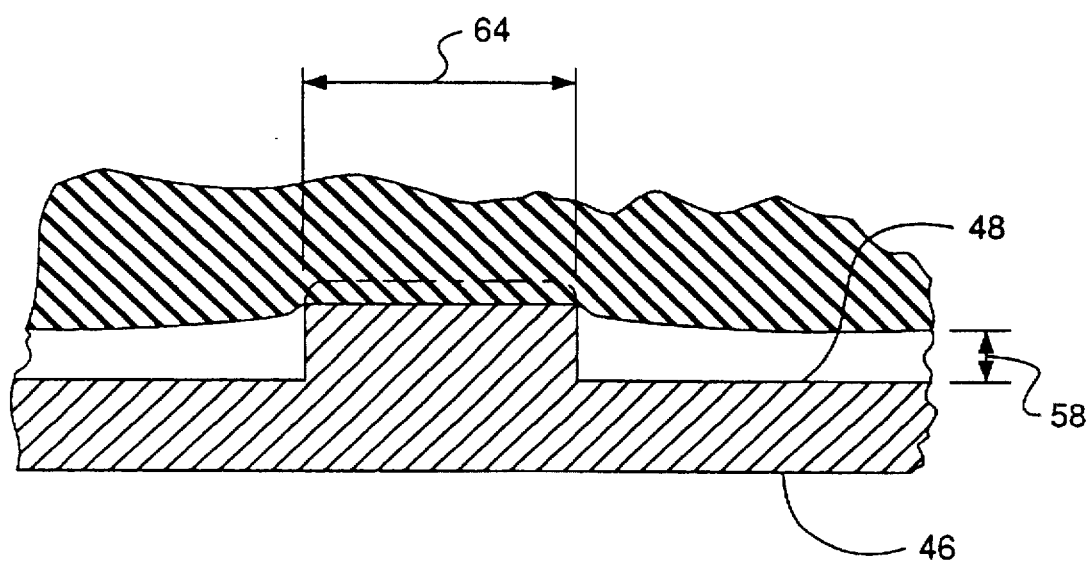
FIG. 5 is an enlarged elevational view of an alternative drive wheel construction and the interface between the drive wheel and the endless belt as taken along lines 5—5 of FIG. 4.

2
BEST MODE FOR CARRYING OUT THE INVENTION

Referring to FIGS. 1 and 2, a work machine 10 is shown having a rubber belted track system 12. The belted track system 12 utilizes a pair of endless belts 14 having an inner surface 15 and being positioned on the sides of the work machine. The work machine includes a chassis 16, an engine 18, transmission 20 and final drive 22 for driving the belted track system 12 in a conventional manner. As an alternative, the conventional system could be of any scope such as a hydrostatic drive system.

In this application, each of the endless tracks 14 is frictionally driven by a drive wheel 24 being powered by the engine 18 in a conventional manner. In as much as the pair of endless tracks 14 are substantially structurally and operatively identical, further reference will be made to only a single side of the belted drive system 12. The endless track 14 is tensioned on the drive wheel 24 by a conventional tensioning system 30 including an idler wheel 32. In this application, the drive wheel 24 positioned near the back of the work machine 10 and the idler wheel 32 is positioned toward the front of the work machine 10. A conventional suspension system operatively attaches the idler wheel 32, the drive wheel 24 and the chassis 16.

As shown in FIG. 3, the drive wheel 24 is shown separated from the work machine 10. The drive wheel 24 includes a pair of mirrored image wheels 34 being made of a metallic material having a generally cylindrical configuration. A mounting disc 40 the wheel 34 is centered about an axis 42 and attaches to the final drive 22 of the work machine 10 in a conventional manner, such as by a hole pattern within the mounting disc, studs and nuts or bolts extending from the final drive 22. Attached to the mounting disc 40 and centered about the axis 42 is a cylindrical drum 44. The cylindrical drum 44 defines an inner surface 46, an outer surface 48 and a pair of side members 50. Extending from the outer surface 48 is a plurality of contacting elements 52 being defined by a plurality of sides 54 and a contacting surface 56. As further shown in FIGS. 4 and 5 with the endless belt 14 in engagement with the drive wheel 24, each of the plurality of contacting elements 52 extend from the outer surface 48 of the drum 44 a preestablished distance 58 which is in the range of about 10 mm to about 20 mm and more precisely in this application about 13 mm. The contacting surface 56 of the contacting elements 52 have a generally diamond configuration defining a leading point of contact 60, a trailing point of contact 62, a major length 64 and a minor length 66. The interface of the diamond configuration of the plurality of contacting elements 52 and the preestablished distance 58 of the plurality of sides 54 define either a sharp edge 67 or a point 68 at the intersection of the plurality of sides 54 and the contacting surface 56. In this application, the major length 64 is about 190 mm and the minor length is about 47 mm. As an alternative, the major length 64 and the minor length 66 could approach substantially the same length without changing the essence of the invention. The plurality of contacting elements 52 are arranged on the drum 44 in a plurality of spaced apart rows 69. Each of the rows 69 extend circumferentially along an axis 70 defined on the cylindrical drum 44 and have a preestablished spacing between respective ones of the leading point of contact 60 and the trailing point of contact 62 of the adjacent contacting elements 52. In this application, the contacting elements 52 are cast as a part of the drum 44 but as an alternative, best shown in FIG. 5 the contacting elements 52 could be formed as a part of the drum 44 or as a further alternative the contacting elements 52 could be welded to the drum 44. Furthermore, the contacting elements 52 are positioned along the axis 70 and are aligned with the major length 64 coinciding with the axis 70. In this application, the spacing of the contacting elements 52 circumferentially along the corresponding row 69 is about 80 mm which is less than the major length 64 of the contacting element 52. Each of the plurality of spaced apart rows 69 have a preestablished distance therebetween which falls within the range of about 16 mm to about 40 mm. In this application the preestablished distance between spaced apart rows 69 is about 18 mm but could as an alternative be about equal to the minor length 66 of the contacting elements 52. Interposed, at least a portion of the plurality of rows 69, are a plurality of openings 72 being spaced a preestablished distance therebetween. The plurality of opening 72 in this application have a uniform size and are defined by a generally oblong configuration but could have as an alternative different sizes and configurations. Furthermore, in this application the plurality of openings 72 are not positioned in each of the preestablished distance between each of the rows 69 and are generally aligned between the leading point of contact 60 and a corresponding trailing point of contact 62. However, as an alternative to the plurality of openings 72 could be positioned in the preestablished distance between the axis 70 and the plurality of contacting elements 52. Additionally, in this application, the plurality of openings 72 are positioned toward the center intermediate the pair of side members 50 verses along or near the pair of side members 50. As an alternative, the plurality of openings 72 could be positioned in each of the preestablished spacing between rows 69. As best shown in FIG. 3, the plurality of rows 69 form a plurality of passages 74 being angled from one of the pair of side members 50 to the other of the pair of side members 50. In this application, the angle to the pair of side members 50 is about 30 degrees, but as an alternative could fall within the range of between 15 to 45 degrees.

Industrial Applicability

Prior to operation, the components of the work machine 10 and the belted track system 12 are assembled. For example, each of the endless belts 14 are positioned about the idler wheel 32 and the drive wheel 24. The conventional tensioning system 30 is actuated and the belted track system 12 is assembled to the components of the work machine 10.

In operation, the work machine 10 is started and forward motion is initiated. The drive wheels 24 receive power from the final drive 22 through the mounting disc 40 and through the drum 44 to the plurality of compacting elements 52. The leading point of contact 60 of corresponding ones of the plurality of contacting elements 52 engages with the inner surface 15 of the endless track 14 and the inner surface 15 deflects around the contacting surface 56 of the contacting element 52. Thus, the sharp edges 67 and the points 68 of the drive wheels 24 aggressively activates the forward motion of the work machine 10 by bitting or indenting into the inner surface 15. The combination of the relative sharp edges 67 formed at the point of connection between the preestablished distance 58 of the plurality of sides 54 from the outer surface 48 of the drum 44 and the contacting surface 56 along the perimeter of the diamond configuration effectively and efficiently drives the work machine 10. The operation of the work machine 10 in the rearward use direction is generally similar with the exception of the trailing point of contact 62 contacts the inner surface 15 of the endless belts 14.

The drive wheels 24 further drive the work machine 10 more efficiently and effectively in a debris ridden environment. For example, the ingestion of debris between the wheels 24 and endless belt 14 is maintained and the driving relationship between the drive wheel 24 and the endless belt 14 continues without damaging to either the driving wheel 24 and the endless belt 14. As the point of contact 60,62 approaches the inner surface 15 of the endless belt 14 the pointed configuration contacts the debris, penetrates the debris and causes the debris to be dissipated into a pair of the plurality of passages 74. As the drive wheel 24 continues to rotate initial contact of the contacting surface 56 with the inner surface 15 of the endless belt 14 takes place and excessive debris is forced from the inner surface 15 of the endless belt 14. The excessive debris is forced into the approbate ones of the plurality of passages 74 and in turn is forced along the passage 74 toward the pair of side members 50 and falls from the interface. To further insure the elimination of debris between the inner surface 15 of the endless belt 14 and the contacting surface 56 of the drive wheel 24 the plurality of openings 72 are positioned in the drum 44 and extend from the outer surface 58 to the inner surface 56. For example, as the debris travel along the plurality of passages 74 a portion of the debris is free to be expelled through the plurality of openings 72 within the preestablished spacing between the plurality of rows 69 of the contacting elements 52.

As the inner surface 15 of the endless belt 14 extends into the preestablished spacing between the plurality of rows 69 any debris trapped therein will have a force exerted thereon. This force will further cause the debris to travel along the plurality of passages 74 to the pair of side members 50 or to escape through the plurality of openings 72.

Thus, the metal drive wheel 24 more effectively and efficiently drives the endless belt 14. The structural integrity of metal drive wheel 24 with the plurality of contacting elements 52 thereon aggressively drives the endless belt 14. Furthermore, the metal drive wheel 24 provides long life for the belt and wheels. The combination of the plurality of passages 74, the plurality of openings 72 and the diamond configuration defining the leading point of contact 60 and the trailing point of contact 62 accommodate debris ingested between the drive wheels 24 and the endless belt 14 while maintaining the driving relationship therebetween without damaging either.

We claim:

1. A drive wheel being adapted for use with an endless rubber belt functionally continually driving a work machine, comprising:

said drive wheel having a mounting disc attached to a generally cylindrical drum defining an outer surface and a pair of side members;

a plurality of contacting elements being made of a metallic material and being attached to the outer surface and being positioned in a plurality of rows defining an axis, each of the plurality of rows extending between the pair of side members and being spaced apart a preestablished distance forming a plurality of passages;

said plurality of contacting elements having a diamond configuration being defined by a plurality of sides and a contacting surface;

said plurality of contacting elements each defining a point of contact and said point of contact further defining a leading point of contact and a trailing point of contact; and said diamond configuration being defined by a major length and a minor length, said major length being aligned with said axis and said diamond configuration of said plurality of contacting elements defining a one of a sharp edge and a point at the intersection of said plurality of sides and said contacting surface.

2. The drive wheel of claim 1 wherein said contacting surface of the plurality of contacting elements are spaced from the outer surface of the cylindrical drum by a distance being less than that of the minor length.

3. The drive wheel of claim 2 wherein said spaced distance from the contacting surface to the outer surface is in the range of about 10 mm to about 20 mm.

4. The drive wheel of claim 1 wherein said plurality of passages extend from one of the pair of side members to the other of the pair of side members.

5. The drive wheel of claim 3 wherein said plurality of passages further have a plurality of openings defined therein.

6. The drive wheel of claim 5 wherein said plurality of openings are positioned generally near the center between the pair of side members.

7. The drive wheel of claim 6 wherein said plurality of openings are generally aligned between the leading point of contact and a corresponding trailing point of contact.

8. The drive wheel of claim 1 wherein said preestablished distance forming the plurality of passages is in the range of about 16 mm to about 40 mm.

\* \* \* \* \*